(12) United States Patent
Scherman et al.

(10) Patent No.: US 10,653,065 B2
(45) Date of Patent: May 19, 2020

(54) GRAIN LOSS GAUGING SYSTEM FOR COMBINE HARVESTER

(71) Applicant: Schergain Holdings Ltd., Battleford (CA)

(72) Inventors: Patrick John Scherman, Battleford (CA); Trevor Dean Scherman, Battleford (CA)

( * ) Notice: Subject to any disclaimer, the term of this patent is extended or adjusted under 35 U.S.C. 154(b) by 0 days.

(21) Appl. No.: 16/495,879

(22) PCT Filed: Jul. 25, 2017

(86) PCT No.: PCT/CA2017/050894
§ 371 (c)(1),
(2) Date: Sep. 20, 2019

(87) PCT Pub. No.: WO2018/184088
PCT Pub. Date: Oct. 11, 2018

(65) Prior Publication Data
US 2020/0029499 A1   Jan. 30, 2020

(30) Foreign Application Priority Data

Apr. 5, 2017  (CA) ...................... 2963225

(51) Int. Cl.
*A01D 41/127* (2006.01)
*G01F 19/00* (2006.01)
*G01F 22/00* (2006.01)

(52) U.S. Cl.
CPC ......... *A01D 41/1273* (2013.01); *G01F 19/00* (2013.01); *G01F 22/00* (2013.01)

(58) Field of Classification Search
CPC .................................................. A01D 41/1273
See application file for complete search history.

(56) References Cited

U.S. PATENT DOCUMENTS

| 4,393,704 A | 7/1983 | Bartko |
| 4,517,792 A * | 5/1985 | Denning ............ A01D 41/1273 |
| | | 460/5 |

(Continued)

FOREIGN PATENT DOCUMENTS

| DE | 198 20 819 | 1/2000 |
| DE | 100 62 114 | 4/2003 |

(Continued)

*Primary Examiner* — Alicia Torres
(74) *Attorney, Agent, or Firm* — Ryan W. Dupuis; Ode & Company Inc.; Kyle R. Satterthwaite

(57) ABSTRACT

A grain loss gauging system for a combine harvester uses a collection pan for releasable attachment to a combine harvester in which the collection pan defines a receptacle having an open top for receiving material blown out of the combine harvester when deposited on the ground. A pair of electromagnets and a controller for selectively supplying electrical power to the electromagnets from a battery are supported on the collection pan to electromagnetically retain pan on a vehicle body of the combine harvester. A remote used remotely from the collection pan can be triggered to generate a wireless trigger signal received by the controller to interrupt the electrical power to the electromagnets and release the electromagnets, the controller, and the battery together with the collection pan from the body of the combine harvester. The combine harvester is adjusted to reduce the amount of grain collected in the pan.

14 Claims, 3 Drawing Sheets

(56) References Cited

U.S. PATENT DOCUMENTS

| | | | |
|---|---|---|---|
| 5,951,395 A | 9/1999 | Peter | |
| 7,362,233 B2 | 4/2008 | Behnke et al. | |
| 7,670,218 B2 | 3/2010 | Behnke et al. | |
| 2008/0318648 A1 | 12/2008 | Baumgarten et al. | |
| 2011/0130180 A1* | 6/2011 | Van Brabant | A01D 41/1273 460/101 |
| 2019/0335659 A1* | 11/2019 | Kringe | A01F 12/448 |
| 2019/0335660 A1* | 11/2019 | Kringe | A01F 12/48 |

FOREIGN PATENT DOCUMENTS

| | | |
|---|---|---|
| DE | 10 2005 013 215 | 9/2010 |
| DE | 10 2016 201 413 | 4/2017 |
| GB | 2 387 098 | 10/2003 |

\* cited by examiner

GRAIN LOSS GAUGING SYSTEM FOR COMBINE HARVESTER

FIELD OF THE INVENTION

The present invention relates to gauging system for gauging grain loss from a combine harvester as the harvester is displaced across ground carrying a crop to be harvested, and more particularly, the present invention relates to a grain loss gauging system including a collection pan including electromagnets supported thereon for releasable attachment to a vehicle body of the combine harvester and a remote for remotely deactivating the electromagnets to selectively drop the collection pan from the combine harvester.

BACKGROUND

A combine harvester is a known type of agricultural implement which is able to travel along ground carrying a crop to be harvested for harvesting the crop and separating usable grain from chaff, i.e. the remains of the cut stocks upon which the grain grows. The usable grain is collected and stored while the chaff is blown from the combine. Depending upon the configuration of the combine, for example the chaff blower speed, varying amounts of grain are often blown from the combine with the chaff. This can result in significant grain losses and lost profits for a farmer.

U.S. Pat. No. 5,951,395 by Jeffrey Peter, U.S. Pat. No. 4,393,704 by Richard Bartko, and Canadian Patent No. 2,687,185 by Norman Van Brabant et al, each describe a grain loss receptacle arranged to be releasably mounted beneath the vehicle body of a combine harvester. By dropping the receptacle onto the ground under normal operation of the combine harvester, the receptacle collects chaff and any grain blown from the combine with the chaff so that the amount of grain can be measured and the combine harvester reconfigured to reduce grain loss. In each instance, however, a dedicated mechanism for supporting and selectively dropping the receptacle is required to be permanently attached to the combine harvester, limiting the use of the receptacle to one combine harvester.

A different mechanism for releasing the receptacle from different types of combine harvesters would accordingly be desirable to allow reduction of grain losses across a group of combine harvesters using a single receptacle.

SUMMARY OF THE INVENTION

A grain loss gauging system for use with a combine harvester that is able to cut a crop to be harvested, separate grain from chaff, capture the grain, and blow the chaff out of the combine harvester, the system comprising:

a collection pan defining a receptacle having an open top for receiving material blown out of the combine harvester when deposited on the ground;

a remote arranged to generate a wireless trigger signal when triggered by an operator and arranged to be located remotely from the collection pan;

at least one electromagnet mounted on the collection pan and being arranged to electromagnetically retain the collection pan on a vehicle body of the combine harvester when supplied with electrical power; and a controller arranged to supply the electrical power to said at least one electromagnet in a normal operating mode and to interrupt the electrical power to said at least one electromagnet such that said at least one electromagnet is released from the vehicle body of the combine harvester together with the collection pan onto the ground in a triggered operating mode in response to receipt of the wireless trigger signal from the remote.

When using electromagnets that retain the collection pan on the vehicle and further supporting the electromagnets, the controller and the power supply on the collection pan itself to be released from the vehicle body together with the collection pan in response to a wireless trigger signal, the collection pan can be readily transferred from one combine harvester to another. Accordingly, a single grain loss gauging system as described herein can be used to configure and reduce grain loss in a large number of different combine harvesters.

Preferably the controller is mounted on the collection pan so as to be arranged to be released from the vehicle body of the combine harvester together with the collection pan in the triggered operating mode.

When providing a battery from which the controller supplies the electrical power to said at least one electromagnet, the battery is also preferably mounted on the collection pan so as to be arranged to be released from the vehicle body of the combine harvester together with the collection pan in the triggered operating mode.

When the collection pan is elongate in a lateral direction, said at least one electromagnet may comprise two electromagnets at laterally spaced apart positions on the collection pan.

The controller and the battery are preferably centrally located in the lateral direction between the two electromagnets for balancing the weight of the collection pan.

The collection pan may include a bottom panel, a plurality of side walls extending upwardly from the bottom panel about a full perimeter of the bottom panel to define the receptacle, a shelf extending generally horizontally outward from the top end of each side wall, and a lip extending upward from the outer end of the shelf.

When the collection pan further comprises two crossbars spanning over the receptacle across a width of the collection pan at a top side of the collection pan, the two electromagnets are preferably supported on the two crossbars respectively so as to be centered in a direction of the width of the pan.

According to a second aspect of the present invention there is provided a method of gauging grain loss from a combine harvester that is suited for cutting a crop to be harvested, separating grain from chaff, capturing the grain, and blowing the chaff out of the combine harvester, the method comprising:

providing a collection pan defining a receptacle having an open top for receiving material blown out of the combine harvester when deposited on the ground;

using at least one electromagnet mounted on the collection pan to electromagnetically retain the collection pan on a vehicle body of the combine harvester;

using a controller operatively associated with said at least one electromagnet to interrupt electrical power supplied to said at least one electromagnet in response to a wireless trigger signal received by the controller such that said at least one electromagnet is released from the vehicle body together with the collection pan onto the ground;

displacing the combine harvester across the ground such that some of the material blown out of the combine harvester is deposited onto the collection pan;

using a separator to separate grain from a remainder of the material deposited onto the collection pan; and measuring an amount of the separated grain from the collection pan.

The method may further include releasing the controller from the vehicle body of the combine harvester together with the collection pan in response to the wireless trigger signal.

When using a battery from which the controller supplies the electrical power to said at least one electromagnet, the method may further include releasing the battery from the vehicle body of the combine harvester together with the collection pan in response to the wireless trigger signal.

The method may also make use of a grain volume measuring tube having a scale thereon with markings which represent volume of grain per unit of collection area of the pan in which the unit of collection area of the pan corresponds to a length of a header of the combine harvester in a lateral direction of the combine harvester by a width of the collection pan transverse to the lateral direction. In this instance, the method may further include measuring a volume of the separated grain in the grain volume measuring tube to determine grain loss in bushels per acre.

The method may further include using said at least one electromagnet mounted on the collection pan to electromagnetically retain the collection pan on a laterally oriented rear beam of the vehicle body of the combine harvester which houses a rear axle for two rear wheels of the combine.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
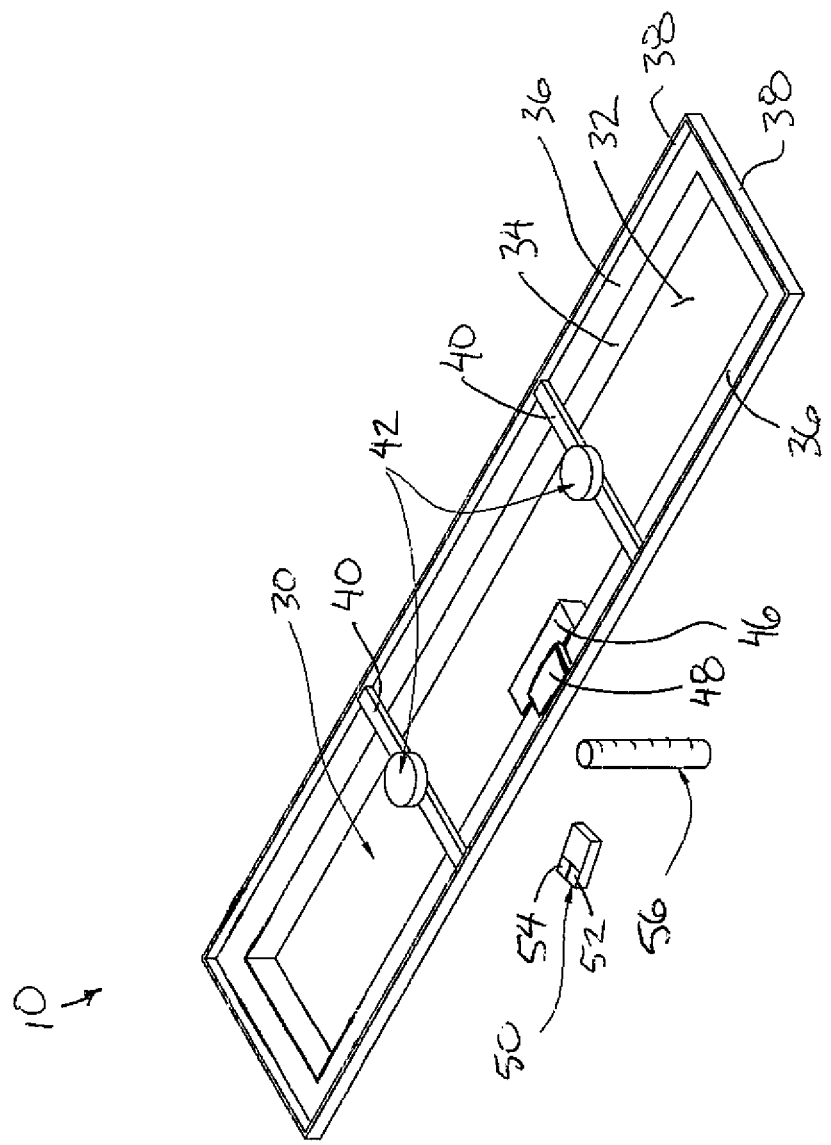
FIG. 1 is a perspective view of the grain loss gauging system of the present invention for gauging grain loss.
Figure 2:
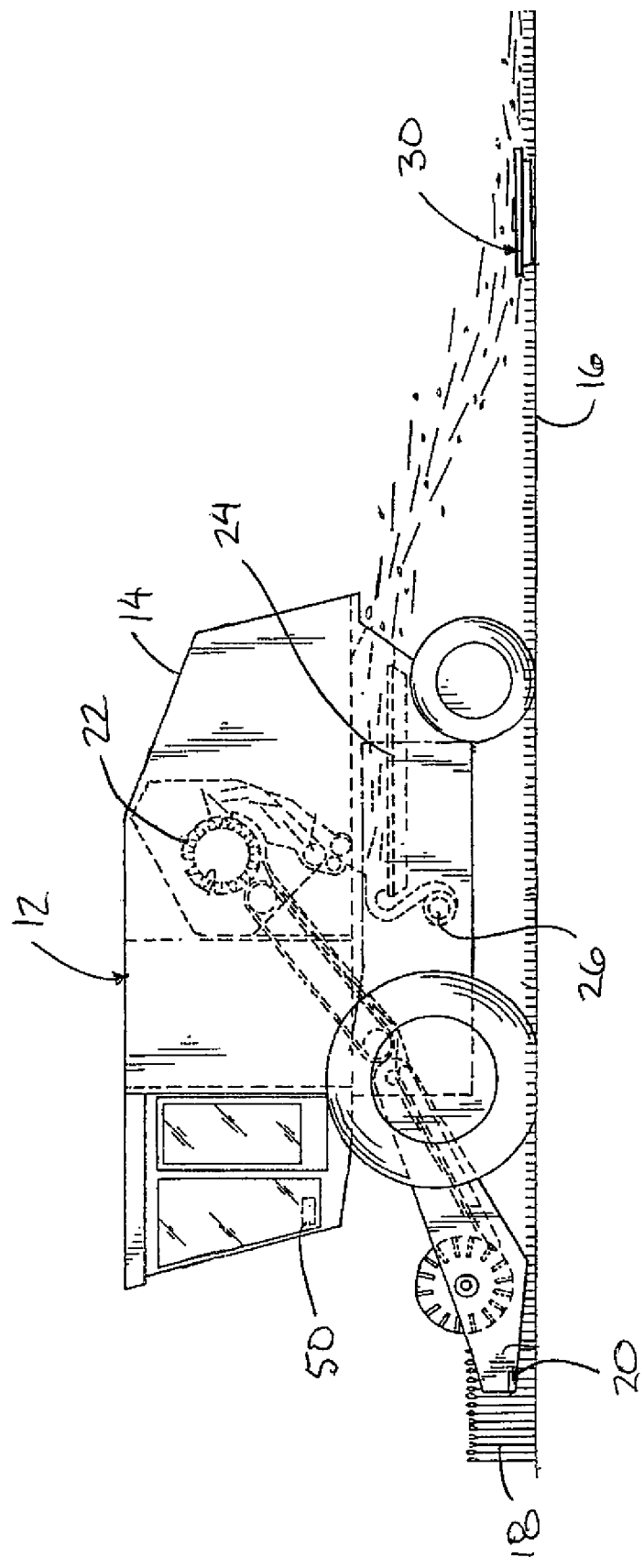
FIG. 2 is a side view of the collection pan system for use with a combine harvester implement.
Figure 3:
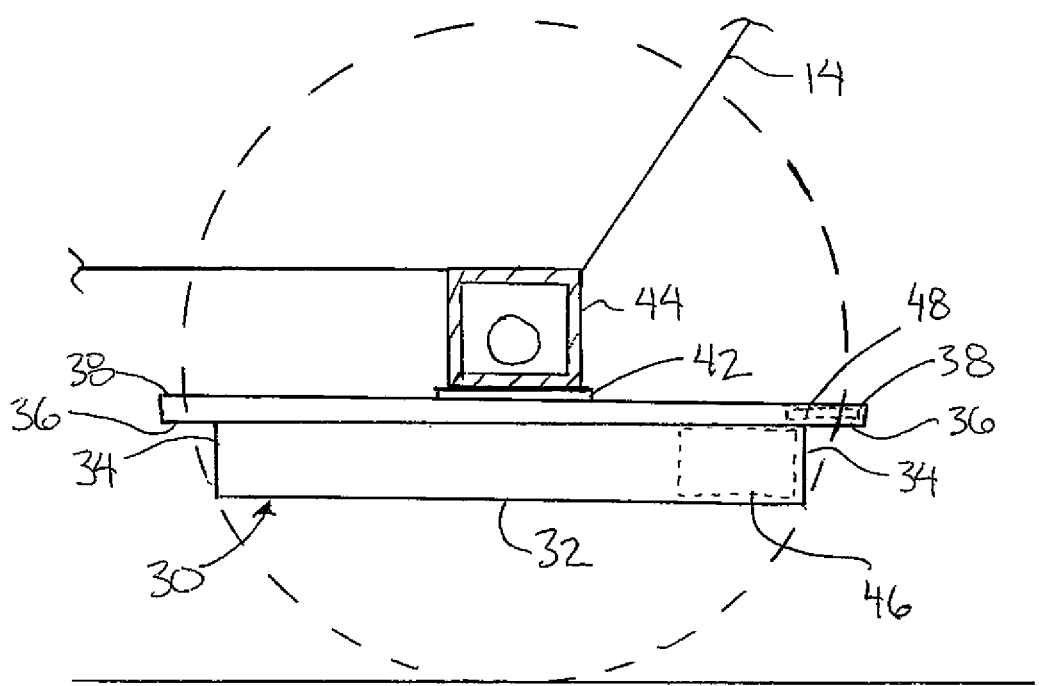
FIG. 3 is a side view of the collection pan of the system shown supported on the rear axle frame portion of the combine harvester implement according to FIG. 2.

Referring to the accompanying figures there is illustrated a grain loss gauging system 10 for use with a combine harvester to gauge the amount of grain being lost by being blown out of the harvester together with the chaff.

Typically, the combine harvester includes a vehicle body 14 supported on wheels for rolling movement in a forward working direction over ground 16 carrying a crop 18 to be harvested. A header at the front end of the vehicle body includes a cutter bar 20 spanning laterally and perpendicularly to the forward working direction for cutting crop as the harvester is displaced forwardly across the ground. The cut crop is guided internally through the vehicle body to a thresher 22 which functions to dislodge the grain from the remaining cut crop materials defining chaff. Sieves 24 within the harvester receive the material from the thresher for separating the grain from the chaff. A blower 26 is used to carry the chaff to a rear discharge of the harvester for discharging the chaff onto the ground. Depending upon the configuration of the sieves and the blower speed, varying amounts of grain can be undesirably blown from the combine harvester together with the chaff.

The system 10 includes a collection pan 30 having a flat rectangular bottom panel 32. The bottom panel 32 and the overall pan are elongate in a lateral direction of the combine harvester in a mounted position. The overall length in the lateral direction is arranged to be less than the lateral distance between the two rear wheels of the combine harvester to allow the combine harvester to roll over the pan dropped on the ground without interference with the wheels.

Side walls 34 extend vertically upwardly from both elongate sides and the two ends of the bottom panel 32 to form a complete perimeter about the bottom panel and define a receptacle for collecting grain and chaff blown into the pan from the combine harvester when the pan is deposited on the ground.

A shelf 36 extends horizontally outward from the top end of each side wall 34 and supports a lip 38 extending vertically upward from the outer end of the shelf such that the side wall has a stepped profile which increases the overall strength of the pan and provides a suitable ledge to be used as a handle for ease of lifting and carrying the pan. The top side of the pan remains open to receive the material blown from the combine therethrough.

Two crossbars 40 are connected perpendicularly between the two long sides of the pan at spaced apart positions in the lateral direction at a top side of the pan. More particularly the two cross bars are each evenly spaced in opposing directions from a lateral centre of the pan. Each crossbar is fixed at both ends to the top side of the respective shelf 36 and has an overall height which is less than the height of the lip 38 so as to be recessed relative to the top end of the pan. Each crossbar thus spans over the receptacle defined by the perimeter side walls 34.

Two electromagnets 42 are mounted on the pan 30 on the two cross bars 40 respectively at a central location along the length of each crossbar. The two electromagnets are thus evenly spaced from a lateral centre of the pan in opposing directions toward opposing ends of the pan. Each electromagnet protrudes upwardly from the respective crossbar upon which it is mounted such that the top side of the electromagnet protrudes up above the top end of the lip of the pan. In this manner, the electromagnets are well suited for abutment to the bottom side of a laterally oriented rear beam 44 of the vehicle body of the harvester frame which houses a rear axle for the two rear wheels of the combine. The two electromagnets can engage the rear beam and electromagnetically retain the pan fixed relative to the vehicle body of the combine harvester without interference between the pan 30 and the vehicle body or the wheels of the combine harvester.

A battery 46 is mounted on the pan to be recessed into the receptacle formed by the pan by being mounted directly against one of the side walls 34 at a laterally central location on the pan between the two electromagnets 42. The battery provides electrical power to the electromagnets to activate the electromagnets and retain the pan electromagnetically secured to the vehicle body.

A controller 48 is also mounted within the receptacle of the pan adjacent to the battery 46 at the laterally central location between the two electromagnets 42. The controller 48 is recessed relative to the top end of the pan and so as to not interfere with mounting of the pan relative to the vehicle body. The controller controls the supply of electrical power from the battery to the electromagnets and is operable between a normal mode and a triggered or off mode. In the normal mode, the controller allows electrical power to be supplied to electromagnetically retain the pan relative to the vehicle body. In the triggered or off mode, the controller interrupts electrical power to the electromagnets such that the electromagnets and the pan are released together from the vehicle body for dropping the pan on the ground.

The controller includes a receiver for receiving a wireless trigger signal and is configured to switch from the normal mode to the triggered or off mode when the trigger signal is wirelessly received.

The system 10 further includes a remote 50 having an independent housing with a respective battery therein for being situated remotely from the collection pan, for example in the cab of the combine harvester. An off button 52 externally on the housing of the remote can be depressed by an operator so that the remote 50 generates a wireless trigger signal and transmits the signal wirelessly to the controller 48 which triggers the controller to interrupt power to the electromagnets for dropping the pan from the vehicle body of the combine harvester.

In operation, the user positions the pan 30 to be elongate in the lateral direction of the combine harvester and activates the electromagnets to retain the pan to the underside of the vehicle body, for example using an on button 54 externally located on the remote 50 to generate an activation signal transmitted wirelessly to the controller 48 which switches from the off mode to the normal mode upon receipt of the activation signal. The user then operates the combine in the usual manner, and triggers the controller 48 to release the pan from the vehicle body and the combine harvester as displaced across the field. Grain and chaff which are blown from the rear discharge of the combine harvester are then deposited on the pan for collection.

The user collects the material deposited on the pan and separates the grain from the chaff using a separator sieve. A measuring tube 56 is provided with scaled markings thereon for measuring the amount of grain collected on the panel. The markings can represent volume of grain per unit of collection area of the pan. More particularly, the unit of collection area of the pan corresponds to a length of a header of the combine harvester in a lateral direction of the combine harvester by a width of the collection pan transverse to the lateral direction. Using correlation data between the volume of grain collected in the pan and the length of the header of the combine harvester for the specified width of the collection pan and a specified grain type, the volume of separated grain in the measuring tube can be used to determine grain loss in units of bushels per acre.

Once a measure of grain loss has been determined, suitable adjustments can be made to the configuration of the combine harvester including the configuration of the sieves or the blower speed for example to minimize the amount of grain loss during normal operation of the combine harvester.

When it is desirable to gauge the grain loss of a different combine harvester, the pan is simply relocated to the vehicle body of the other harvester to be electromagnetically retained thereon using the same steps described above. Each time the collection pan is dropped from the vehicle body of a combine harvester, the controller, the battery, and the electromagnets are released from the vehicle body together with the collection pan such that the collection pan is ready for immediate use with a different combine harvester.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A grain loss gauging system in combination with a combine harvester that is able to cut a crop to be harvested, separate grain from chaff, capture the grain, and blow the chaff out of the combine harvester, the system comprising:

a collection pan defining a receptacle having an open top for receiving material blown out of the combine harvester when deposited on the ground;

a remote arranged to generate a wireless trigger signal when triggered by an operator and arranged to be located remotely from the collection pan;

at least one magnetic device mounted on the collection pan and being arranged to magnetically retain the collection pan on a vehicle body of the combine harvester in a normal operating mode; and a controller arranged to change operation of the at least one magnetic device from the normal operating mode to a triggered operating mode such that the at least one magnetic device is released from the vehicle body of the combine harvester together with the collection pan onto the ground in the triggered operating mode in response to receipt of the wireless trigger signal from the remote.

2. The system according to claim 1 wherein the controller is mounted on the collection pan so as to be arranged to be released from the vehicle body of the combine harvester together with the collection pan in the triggered operating mode.

3. The system according to claim 1 further comprising a battery from which the controller supplies the electrical power to said at least one magnetic device, the battery being mounted on the collection pan so as to be arranged to be released from the vehicle body of the combine harvester together with the collection pan in the triggered operating mode.

4. The system according to claim 3 wherein the collection pan is elongate in a lateral direction and wherein the battery is centrally located in the lateral direction.

5. The system according to claim 1 wherein the collection pan is elongate in a lateral direction and wherein said at least one magnetic device comprises two magnetic devices at laterally spaced apart positions on the collection pan.

6. The system according to claim 5 wherein the controller is centrally located in the lateral direction between the two magnetic devices.

7. The system according to claim 1 wherein the collection pan comprises a bottom panel, a plurality of side walls extending upwardly from the bottom panel about a full perimeter of the bottom panel to define the receptacle, a shelf extending generally horizontally outward from the top end of each side wall, and a lip extending upward from the outer end of the shelf.

8. The system according to claim 1 wherein said at least one magnetic device comprises two magnetic devices and wherein the collection pan comprises two crossbars spanning over the receptacle across a width of the collection pan at a top side of the collection pan, the two magnetic devices being supported on the two crossbars respectively.

9. A method of gauging grain loss from a combine harvester that is suited for cutting a crop to be harvested, separating grain from chaff, capturing the grain, and blowing the chaff out of the combine harvester, the method comprising:

providing a collection pan defining a receptacle having an open top for receiving material blown out of the combine harvester when deposited on the ground;

using at least one magnetic device mounted on the collection pan to magnetically retain the collection pan on a vehicle body of the combine harvester;

using a controller operatively associated with said at least one magnetic device to alter electrical power supplied to said at least one magnetic device in response to a wireless trigger signal received by the controller such that said at least one magnetic device is released from the vehicle body together with the collection pan onto the ground;

displacing the combine harvester across the ground such that some of the material blown out of the combine harvester is deposited onto the collection pan;

using a separator to separate grain from a remainder of the material deposited onto the collection pan; and measuring an amount of the separated grain from the collection pan.

10. The method according to claim 9 including releasing the controller from the vehicle body of the combine harvester together with the collection pan in response to the wireless trigger signal.

11. The method according to claim 9 including providing a battery from which the controller supplies the electrical power to said at least one magnetic device and releasing the battery from the vehicle body of the combine harvester together with the collection pan in response to the wireless trigger signal.

12. The method according to claim 9 wherein the collection pan is elongate in a lateral direction and wherein said at least one magnetic device comprises two magnetic devices at laterally spaced apart positions on the collection pan.

13. The method according to claim 9 including providing a grain volume measuring tube having a scale thereon with markings which represent volume of grain per unit of collection area of the pan in which the unit of collection area of the pan corresponds to a length of a header of the combine harvester in a lateral direction of the combine harvester by a width of the collection pan transverse to the lateral direction, and measuring a volume of the separated grain in the grain volume measuring tube to determine grain loss in bushels per acre.

14. The method according to claim 9 including using said at least one magnetic device mounted on the collection pan to electromagnetically retain the collection pan on a laterally oriented rear beam of the vehicle body of the combine harvester which houses a rear axle for two rear wheels of the combine.

\* \* \* \* \*